United States Patent [19]

Kanoh et al.

[11] 4,151,337

[45] Apr. 24, 1979

[54] PROCESS FOR PREPARING POLYOLEFIN

[75] Inventors: Natsuki Kanoh, Sagamihara; Toru Tanaka, Komae; Nobuo Enokido, Tokyo, all of Japan

[73] Assignee: Mitsubishi Chemical Industries Ltd., Tokyo, Japan

[21] Appl. No.: 800,177

[22] Filed: May 25, 1977

[30] Foreign Application Priority Data

Aug. 17, 1976 [JP] Japan .................. 51-98103

[51] Int. Cl.$^2$ .......................... C08F 4/66; C08F 10/02
[52] U.S. Cl. .................. 526/116; 252/429 B; 252/429 C; 526/133; 526/158; 526/348.6; 526/352
[58] Field of Search .............. 526/116, 133, 158

[56] References Cited

U.S. PATENT DOCUMENTS

| | | | |
|---|---|---|---|
| 3,042,626 | 7/1962 | Bruce et al. | 526/158 |
| 3,325,424 | 6/1967 | Tornqvist et al. | 526/116 |
| 3,745,154 | 7/1973 | Kashiwa | 526/116 |
| 3,989,881 | 11/1976 | Yamaguchi et al. | 526/125 |
| 4,060,593 | 11/1977 | Kazuo et al. | 526/142 |

FOREIGN PATENT DOCUMENTS

| | | | |
|---|---|---|---|
| 872142 | 7/1961 | United Kingdom | 526/116 |
| 954609 | 4/1964 | United Kingdom | 526/116 |
| 1198719 | 12/1966 | United Kingdom | 526/133 |
| 1284121 | 8/1972 | United Kingdom | 526/116 |

*Primary Examiner*—Edward J. Smith
*Attorney, Agent, or Firm*—Oblon, Fisher, Spivak, McClelland & Maier

[57] ABSTRACT

Polyolefin is prepared by polymerizing an olefin by using a catalyst system combining an auxiliary catalytic component of an organoaluminum compound and a solid catalytic component obtained by reacting a mixture of a vanadium trichloride ether complex and a titanium trichloride ether complex with an aluminum halide and/or a boron halide.

13 Claims, No Drawings

PROCESS FOR PREPARING POLYOLEFIN

BACKGROUND OF THE INVENTION

1. Field of the Invention:

The present invention relates to a process for preparing a polyolefin. More particularly, it relates to a process for preparing a polyolefin in the presence of a titanium vanadium type catalytic component having high catalytic activity.

2. Description of Prior Art:

If a catalytic activity for polymerization is high enough to use the resulting polyolefin without separating catalyst residues from the polymer in the preparations of the polyolefins, the industrial advantage of an elimination of the catalyst residues separating step is remarkable.

However, the conventional catalysts do not possess satisfactorily high catalytic activity so as to use the resulting polyolefin without separating the catalyst residues.

SUMMARY OF THE INVENTION

It is an object of the present invention to provide a process for preparing a polyolefin with a catalyst which has enough high catalytic activity to impart said industrial advantages for eliminating a step of separating catalyst residues from the resulting polyolefin.

The foregoing and other objects of the present invention have been attained by providing a process for preparing a polyolefin by polymerizing an olefin by using a catalyst system combining an auxiliary catalytic component of an organoaluminum compound and a solid catalytic component obtained by reacting a mixture of a vanadium trichloride ether complex and a titanium trichloride ether complex with an aluminum halide and/or a boron halide.

DESCRIPTION OF THE PREFERRED EMBODIMENTS

The first advantage of the present invention is to be able to use the resulting polyolefins without separating catalyst residues from the polyolefins.

The second advantage of the present invention is to be able to control the molecular weight distribution of the resulting polyolefins as desired.

In usual, a polyolefin having narrow molecular weight distribution is preferable for an injection molding grade with high melt-flow whereas a polyolefin having high molecular weight (low melt index) which has high processability is preferable for a blow molding grade whereby a polyolefin having relatively wide molecular weight distribution is preferable.

It has been required to use different catalytic system or to employ a polymer blend or the other complicated method in order to control the molecular weight distribution of the polyolefins in the polymerization of olefins in the presence of the Zieglar catalysts.

However, in accordance with the process of the present invention, the molecular weight distribution can be easily controlled in wide range by varying a ratio of the vanadium trichloride ether complex to the titanium trichloride ether complex, whereby various kinds of polyolefins suitable for the injection molding, the blow molding and the extrusion molding grades can be respectively prepared by using the similar type catalyst.

The vanadium trichloride ether complexes and the titanium trichloride ether complexes used in the invention are respectively complexes of vanadium trichloride or complexes of titanium trichloride coordinating with one of various ethers.

The ether complexes can be prepared by treating the trichloride in the corresponding ether at a boiling point or lower temperature and removing excess of the ether, preferably under a reduced pressure.

Suitable ethers include cyclic ethers such as tetrahydrofuran, tetrahydropyran, furan, pyran, dioxane; straight chain type ethers such as diethyl ether, diisopropyl ether, diisobutyl ether, diisopentyl ether; aromatic ethers such as methylphenyl ether etc.

It is preferable to use cyclic ethers, especially, tetrahydrofuran and tetrahydropyran from the viewpoint of easy formation of the complex and solubility of the complex to a solvent.

The titanium trichloride and vanadium trichloride used for preparing the ether complexes can be $TiCl_3$ and $VCl_3$ as well as complexes of an aluminum compound with $TiCl_3$ or $VCl_3$ which are obtained by reducing $TiCl_4$ or $VCl_4$ with aluminum or organoaluminum compound.

The molar ratio of the vanadium trichloride ether complex to the titanium trichloride ether complex (V/Ti) is in a range of 0.001 to 3000 in the preparation of the catalyst.

Aluminum halides and boron halides which react with the mixture of the ether complexes have the formula $$AlX_3 \text{ or } BX_3$$

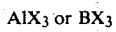

wherein X represents a halogen atom.

Suitable aluminum halides and boron halides include $AlF_3$, $AlCl_3$, $AlBr_3$, $AlI_3$, $AlBrI_2$, $BF_3$, $BCl_3$, $BBr_3$, $BI_3$, $BClBr_2$ etc.

It is especially preferable to use $AlCl_3$, $AlBr_3$, $AlI_3$, $BF_3$, $BCl_3$ or $BBr_3$.

The amount of the aluminum halide and/or the boron halide is preferably more than 0.3 mole, especially 1.5 to 10 mole to one mole of total of Ti and V in the mixture of the ether complexes.

It is preferable to react the mixture of the vanadium trichloride ether complex and the titanium trichloride ether complex with the aluminum halide and/or the boron halide in a solvent.

In usual, the vanadium trichloride ether complex and the titanium trichloride ether complex are dissolved in the solvent and then, the amuminum halide and/or the boron halide is added to the solution.

The mixture of ether complexes can be dissolved in the solvent after mixing them. Each of the ether complexes can be respectively dissolved in each solvent and both solutions can be mixed.

It is also possible that a mixture of vanadium trichloride and titanium trichloride is treated with the ether to form the ether complexes and the ether complexes are dissolved in the solvent to form a solution of the ether complexes.

The aluminum halide or the boron halide is added with or without dissolving it in a solvent.

When the aluminum halide or the boron halide is in a gaseous form, the gaseous halide can be introduced into the solution with or without a carrier inert gas such as nitrogen and argon etc.

The reaction is usually conducted at near room temperature. Of course, the reaction can be conducted under heating it to the temperature of lower than the boiling point of the solvent.

It is preferable to use the solvents which dissolve the aluminum halide, the boron halide and the ether complexes thereof but should not dissolve the resulting solid catalytic component, and preferably dissolve the vanadium trichloride ether complex and the titanium trichloride ether complex.

Suitable solvents can be hydrocarbons such as hexane, heptane, benzene, toluene, halogenated hydrocarbons such as tetrachloromethane, chloroform, dichloroethane, trichloroethane, butylchloride, chlorobenzene etc.

It is preferable to use a halogenated hydrocarbon.

It is considered that when the vanadium trichloride ether complex or the mixture of vanadium trichloride ether complex and titanium trichloride ether complex is reacted with the aluminum halide and/or boron halide, a part or whole of ether in the complex is separated to form a solid having secondary structure of crystallites and the separated free ether is reacted with the aluminum halide and/or boron halide to form the aluminum halide and/or boron halide ether complex, which may be removed by washing with a solvent.

The solid catalytic component obtained by the process of the present invention is characterized by resulting small particle size of crystallites which is considered to be one of the reasons for the advantages of remarkably high catalytic activity which could not attained by the conventional catalytic components.

The secondary structure of the crystallites is formed by the aggromeration of crystallites to form a solid catalytic particles. The average diameter of the particles is dependent upon the condition of the process and is in a range of 3 to $20\mu$ and the distribution of the particle diameters is remarkably narrow.

Accordingly, when polyolefin is prepared by the slurry polymerization of the gaseous polymerization by the process of the present invention, the distribution of diameters of the resulting polyolefin particles becomes quite narrow and the handling of the resulting polyolefin powder is remarkably advantageous.

The object solid catalytic component can be obtained as the precipitate by the reaction. It is preferable to wash the precipitate with the solvent for removing the excess aluminum halide and/or the boton halide, and the ether complexes in the reaction mixture.

When the halogenated hydrocarbon is used as a solvent, it is preferable to remove the solvent by the distillation or the other method, or to replace it with a hydrocarbon preferably a solvent which is used in the polymerization of an olefin.

Suitable organoaluminum compound used as the auxiliary catalyst in the invention include trialkylaluminum such as trimethylaluminum, triethylaluminum, tripropylaluminum, triisobutylaluminum, trioctylaluminum; dialkylaluminum monohalides such as dimethylaluminum monochloride, diethylaluminum monochloride; alkylaluminum sesquihalides such as methylaluminum sesquichloride, ethylaluminum sesquichloride; dialkyl aluminum monoalkoxides such as diethylaluminum monoethoxide, diethalumiunum monomethoxide etc.

It is preferable to use the trialkylaluminum or dialkylaluminum monohalide.

The ratio of the solid catalytic component to the auxiliary catalytic component is in a range of 0.1 to 100, preferably 1 to 10 as a molar ratio of Al/Ti+V.

The polymerization of an olefin is conducted by using the resulting catalyst system.

Suitable olefins used in the process of the present invention include ethylene, propyrene, butene-1, pentene-1, octene-1 etc.

It is possible to copolymerize two or more olefins.

The process of the present invention is especially preferable to prepare a polyolefin such as a homopolymer of ethylene; a copolymer containing less than 10 wt. %, preferably less than 5 wt. % of one or more comonomer units based on ethylene unit.

Suitable comonomers used in the process of the present invention include an α-olefin having the carbon number of 3 to 12 such as propyrene, butene-1, pentene-1, octene-1 etc.

The polymerization of an olefin can be a solution polymerization, a slurry polymerization in an inert solvent or a gaseous polymerization in the absence of a solvent.

In usual, the polymerization is conducted in the presence of an inert solvent by feeding an olefin or an olefin mixture at suitable temperature and pressure.

Suitable inert solvents include aliphatic hydrocarbons such as pentane, hexane, heptane, octane, isooctane; alicyclic hydrocarbons such as cyclopentane, cyclohexane, and aromatic hydrocarbons such as benzene, toluene etc.

The polymerization of an olefin is usually conducted at the temperature of the room temperature to 200° C. under the pressure of the atmospheric pressure to 100 atm..

When hydrogen is introduced into the polymerization zone, the effect for controlling the molecular weight by hydrogen is remarkably high to easily obtain the polymer having suitable molecular weight.

The amount of hydrogen is dependent upon the condition of polymerization and molecular weight of the object polyolefin and it should be selected depending upon these factors.

As described above, the advantage of the present invention is to use the catalyst having high catalytic activity and the other advantage of the present invention is to be able to control the molecular weight distribution as desired from polyolefins having wide molecular weight distribution to give excellent processability to polyolefins having narrow molecular weight distribution by varying the ratio of V/Ti in the ether complexes.

The molecular weight distribution is rated by the flow ratio (hereinafter referred to as FR) which corresponds to the shear stress dependency of melt viscosity which is shown by the ratio of melt indexes measured at shear stresses of $10^6$ dyne/cm$^2$ and $10^5$ dyne/cm$^2$ according to ASTM-D-1238-57T.

When FR is high, the molecular weight distribution is wide whereas when FR is low, it is narrow.

In accordance with the process of the present invention, FR can be easily controlled in the wide range so as to meet to desirable grades of polyolefins by varying the ratio of V/Ti in the ether complexes.

When the molar ratio of the vanadium trichloride ether complex to the titanium trichloride ether complex (V/Ti) is in a range of more than 200 to 3000, it is possible to obtain the polyethylene having wide molecular weight distribution and FR of 45 to 120 or more.

When the molar ratio (V/Ti) is in a range of 0.001 to 0.1 or 20 to 200, it is possible to obtain the polyethylene having FR of 20 to 50.

When the molar ratio (V/Ti) is in a range of more than 0.1 to less than 20, it is possible to obtain the polyethylene having narrow molecular weight distribution and FR of 15 to 25.

The invention will be further illustrated by certain Examples which are provided herein for purpose of illustration only and are not intended to be limiting in any manner unless otherwise specified.

In the Examples, the polymerization activity of the catalyst, K value was given as K=(g-polymer/g-catalyst×hr.×ethylene pressure Kg/cm$^2$) and the melt index MI is measured by the method of ASTM D-1238-57 T under a load of 2.16 Kg.

PREPARATION 1:

Preparation of ether complex of titanium trichloride:

In a Soxhlet extractor, 10 g of a commercially available titanium trichloride was dissolved, under reflux, in 400 ml of dry and oxygen free tetrahydrofuran (THF).

After about 10 hours, the solid TiCl$_3$ substantially disappeared. The THF solution had deep violet color and was concentrated at 30° C. under a reduced pressure to remove excess THF, whereby a sky blue powder was obtained.

According to the elemental analysis, the product was TiCl$_3$.3THF.

|  | Ti | Cl | C | H |
|---|---|---|---|---|
| Found (wt. %) | 12.8 | 28.6 | 40.0 | 6.5 |
| Calculated as TiCl$_3$ 3THF (wt. %) | 13.0 | 28.7 | 38.9 | 6.5 |

The preparation of the powder was repeated except using tetrahydropyran (THP) instead of THF.

According to the elemental analysis, the product was TiCl$_3$.3THP.

|  | Ti | Cl | C | H |
|---|---|---|---|---|
| Found (wt. %) | 11.4 | 25.5 | 44.0 | 7.4 |
| Calculated as TiCl$_3$ 3THP (wt. %) | 11.6 | 25.8 | 43.6 | 7.3 |

PREPARATION 2:

Preparation of ether complex of vanadium trichloride:

A 10 g of vanadium trichloride was stirred in 400 ml of the dry and oxygen free THF under reflux for 5 hours to dissolve most of VCl$_3$.

The solution had deep reddish brown color and was concentrated at 30° C. under a reduced pressure to remove excess THF, whereby a reddish orange powder was obtained.

According to the elemental analysis, the product was VCl$_3$. 3THF.

|  | V | Cl | C | H |
|---|---|---|---|---|
| Found (wt. %) | 13.9 | 28.5 | 38.4 | 6.2 |
| Calculated as VCl$_3$ . 3 THF (wt. %) | 13.6 | 28.5 | 38.6 | 6.4 |

The preparation of the powder was repeated except using THP instead of THF.

According to the elemental analysis, the product was VCl$_3$.2.6 THP.

|  | V | Cl | C | H |
|---|---|---|---|---|
| Found (wt.%) | 13.5 | 27.7 | 40.5 | 6.7 |
| Calculated as VCl$_3$ . 2.6 THP (wt. %) | 13.4 | 27.9 | 40.9 | 6.8 |

EXAMPLES 1 TO 10 AND REFERENCES 1 to 2:

(1) Preparation of Solid Catalytic Component:

In 90 ml of 1,2-dichloroethane, each specific amount of TiCl$_3$.3 THF or VCl$_3$.3 THF prepared in Preparation 1 and 2 was dissolved and 3.5 g of AlCl$_3$ powder was added to the solution with stirring.

The formation of violet precipitate was initiated by the addition. The mixture was stirred at 50° C. for about 1 hour.

After cooling it to the room temperature, the precipitate was washed with 1,2-dichloroethane and then, 1,2-dichloroethane was substituted by n-hexane by a decantation to obtain a slurry of Ti and V containing solid in n-hexane.

(2) Polymerization of Ethylene:

Into a 1 liter autoclave equipped with a stirrer, 500 ml of purified n-hexane was charged and 5 mg of the slurry by solid component prepared in the previous process (1) and 0.1 m mole of triisobutyl aluminum were added.

The mixture was heated at 90° C., hydrogen was introduced to be the predetermined pressure and then ethylene was introduced to initiate the polymerization.

The polymerization of ethylene was found when ethylene was introduced. Ethylene was further introduced to maintain the constant total pressure. The polymerization was stopped by charging ethanol under pressure after 1 hour.

The results are shown in Table 1.

It was found that the catalyst of the present invention gave high K value. When the ratio of V/Ti is high, FR was remarkably high.

REFERENCE 3:

The polymerization of ethylene was repeated in accordance with the process of Example 4 except using a mixture of 2.5 mg of the catalytic component of Reference 1 and 2.5 mg of the catalytic component of Reference 2.

The result is shown in Table 1.

EXAMPLES 11 to 17:

The polymerization of ethylene was repeated in accordance with the process of Example 7 except using various aluminum halides or boron halides instead of 3.5 g of AlCl$_3$.

The results are shown in Table 2.

EXAMPLES 18 TO 23:

The polymerization of ethylene was repeated in accordance with the process of Example 4 except varying the kind and amount of the ether complex used in the preparation of solid catalytic component and the condition of polymerization as shown in Table 3.

The results are shown in Table 3.

EXAMPLE 24:

The polymerization of ethylene was repeated in accordance with the process of Example 7 except using 0.15 m mole of diethylaluminum chloride instead of 0.1 m mole of triisobutylaluminum.

As the result, 122 g of polyethylene was obtained. The K value was 4210.

EXAMPLE 25:

The polymerization was repeated in accordance with the process of Example 7 except mixing butene-1 with ethylene to maintain 0.25 of a malar ratio of butene-1 to ethylene in the liquid phase in the polymerization of ethylene and butene-1. As the result, 201 g of powdery polymer having 2.1 of ethyl groups per 1000 of carbon atoms in the main chain was obtained, according to the infrared spectrography analysis. The K value was 6930.

EXAMPLES 26 TO 32:

The polymerization of ethylene was repeated in accordance with the process of Example 2 except using various aluminum halides and boron halides instead of 3.5 g of $AlCl_3$.

The results are shown in Table 4.

EXAMPLES 33 TO 35:

The polymerization of ethylene was repeated in accordance with the process of Example 2 except varying the kind and amount of the ether complex.

The results are shown in Table 5.

EXAMPLE 36:

The polymerization of ethylene was repeated in accordance with the process of Example 2 except using 0.15 m mole of diethylaluminum chloride instead of 0.1 m mole of triisobutylaluminum.

As the result, 69 g of polyethylene having a MI of 0.26 and a FR of 90 was obtained. The K value was 1,500.

EXAMPLE 37:

The polymerization was repeated in accordance with the process of Example 2 except mixing butene-1 with ethylene to maintain 0.25 of a molar ratio of butene to ethylene in the liquid phase in the polymerization of ethylene and butene-1. As the result, 130 g of powdery polymer having 2.1 of ethyl groups per 1000 of carbon atoms in the main chain, according to the infrared spectrography analysis, and a MI of 0.28 and a FR of 90 was obtained. The K value was 2,830.

Table 1

| | $TiCl_3 \cdot 3THF$ (g) | $VCl_3 \cdot 3THF$ (g) | V/Ti molar ratio | $H_2$ part. pressure | ethylene part.(g) pressure | polyethylene yield (g) | MI g/10 min. | FR | K |
|---|---|---|---|---|---|---|---|---|---|
| Ex. | | | | | | | | | |
| 1 | 0.0064 | 3.2 | 500/1 | 1.10 | 8.46 | 93 | 0.25 | 75 | 2,200 |
| 2 | 0.0032 | 3.2 | 1000/1 | 1.10 | 9.17 | 92 | 0.21 | 95 | 2,000 |
| 3 | 0.0021 | 3.2 | 1500/1 | 1.10 | 9.17 | 97 | 0.22 | 98 | 2,100 |
| 4 | 0.063 | 3.2 | 50/1 | 2.61 | 5.80 | 99 | 0.30 | 48 | 3,420 |
| 5 | 0.15 | 3.1 | 20/1 | 3.77 | 5.80 | 122 | 0.75 | 35 | 4,210 |
| 6 | 0.40 | 2.8 | 7/1 | 5.85 | 5.85 | 150 | 3.6 | 22 | 5,120 |
| 7 | 1.6 | 1.6 | 1/1 | 5.80 | 5.80 | 164 | 2.1 | 20 | 5,650 |
| 8 | 2.8 | 0.41 | 1/7 | 5.85 | 5.85 | 123 | 2.3 | 35 | 4,210 |
| 9 | 3.1 | 0.15 | 1/20 | 5.80 | 5.80 | 106 | 1.9 | 38 | 3,670 |
| 10 | 3.1 | 0.064 | 1/50 | 5.80 | 5.80 | 94 | 0.20 | 49 | 3,250 |
| Reference | | | | | | | | | |
| 1 | 3.2 | 0 | 0 | 5.60 | 5.60 | 31 | 2.5 | 35 | 1,100 |
| 2 | 0 | 3.2 | — | 0.60 | 6.00 | 30 | 0.52 | — | 1,000 |
| 3 | — | — | — | 1.74 | 5.80 | 29 | 0.60 | — | 1,000 |

Table 2:

| Example No. | Amount of Al or B halides (g) | Polyethylene yield (g) | K value | MI | FR |
|---|---|---|---|---|---|
| 11 | $AlCl_3$ 1.8 | 105 | 3,620 | 2.5 | 19 |
| 12 | $AlCl_3$ 5.2 | 93 | 3,210 | 2.0 | 20 |
| 13 | $AlCl_3$ 7.0 | 76 | 2,620 | 2.1 | 20 |
| 14 | $BCl_3$ 1.6 | 131 | 4,510 | 2.3 | 20 |
| 15 | $BCl_3$ 3.1 | 166 | 5,710 | 1.9 | 21 |
| 16 | $BBr_3$ 20.0 | 134 | 4,630 | 2.2 | 20 |
| 17 | ($AlCl_3$ 1.8, $BBr_3$ 8.1) | 163 | 5,630 | 2.3 | 19 |

Table 3

| Ex. No. | $TiCl_3$ ether complex (g) | $VCl_3$ ether complex (g) | V/Ti molar ratio | $H_2$ part. pressure (Kg/cm$^2$) | Ethylene part.pressure(Kg/cm$^2$) | Polyethylene yield (g) | K value | MI | FR |
|---|---|---|---|---|---|---|---|---|---|
| 18 | $TiCl_3 \cdot 3THF$ 1.6 | $VCl_3$ 2.6 THP 1.6 | 1/1 | 5.80 | 5.80 | 160 | 5,530 | 2.5 | 20 |
| 19 | $TiCl_3 \cdot 3THP$ 1.8 | $VCl_3 \cdot 3THF$ 1.6 | 1/1 | 5.80 | 5.80 | 147 | 5,070 | 2.4 | 21 |
| 20 | $TiCl_3 \cdot 3THP$ 3.0 | $VCl_3$ 2.6 THP 0.56 | 1/5 | 5.80 | 5.80 | 118 | 4,060 | 2.1 | 19 |
| 21 | $TiCl_3 \cdot 3THP$ 1.8 | ″ 1.6 | 1/1 | 5.80 | 5.80 | 155 | 5,360 | 2.3 | 22 |

Table 3-continued

| Ex. No. | TiCl3 ether complex (g) | VCl3 ether complex (g) | V/Ti molar ratio | H2 part. pressure (Kg/cm²) | Ethylene part.pressure(Kg/cm²) | Polyethylene yield (g) | K value | MI | FR |
|---|---|---|---|---|---|---|---|---|---|
| 22 | " 0.60 | " 2.8 | 5/1 | 4.93 | 5.80 | 148 | 5,510 | 0.70 | 35 |
| 23 | " 0.034 | " 3.4 | 100/1 | 3.20 | 8.00 | 121 | 3,020 | 0.45 | 50 |

Table 4

| Example No. | Amount of Al or B halides (g) | polyethylene yield (g) | K | MI | FR |
|---|---|---|---|---|---|
| 26 | AlCl3 1.8 | 79 | 1,720 | 0.36 | 80 |
| 27 | AlCl3 5.2 | 80 | 1,750 | 0.24 | 99 |
| 28 | AlCl3 7.0 | 66 | 1,430 | 0.22 | 98 |
| 29 | BCl3 1.6 | 98 | 2,130 | 0.21 | 102 |
| 30 | BCl3 3.1 | 106 | 2,320 | 0.22 | 99 |
| 31 | BBr3 20.0 | 85 | 1,850 | 0.26 | 80 |
| 32 | (AlCl3 1.8 / BBr3 8.1) | 110 | 2,410 | 0.21 | 110 |

Table 5

| Example No. | TiCl3 ether complex (g) | VCl3 ether complex (g) | V/Ti molar ratio | Polyethylene (g) | K value | MI | FR |
|---|---|---|---|---|---|---|---|
| 33 | TiCl3 . 3THF 0.0032 | VCl3 2.6THP 3.2 | 1000/1 | 105 | 2,280 | 0.25 | 98 |
| 34 | TiCl3 . 3THP 0.0032 | VCl3 . 3THF 3.2 | 1000/1 | 106 | 2,310 | 0.24 | 112 |
| 35 | " 0.0032 | VCl3 . 2.6THP 3.2 | 1000/1 | 94 | 2,060 | 0.23 | 95 |

What is claimed is:

1. A process for preparing a polyolefin which comprises polymerizing an olefin by using a catalyst system combining an auxiliary catalytic component of an organoaluminum compound and a solid catalytic component obtained by reacting a mixture of a vanadium trichloride ether complex and a titanium trichloride ether complex with an aluminum halide and/or a boron halide in a solvent in which the resultant ether complex of said aluminum halide and/or said boron halide is soluble and said solid catalytic component is insoluble, and separating the resultant precipitate containing said solid catalytic component; wherein the olefin is ethylene or a mixture of ethylene and an α-olefin comonomer having from 3 to 12 carbon atoms, in a ratio such that the resulting copolymer contains less than 10 wt. % of said comonomer units; and wherein the molar ratio of the vanadium trichloride ether complex to the titanium trichloride ether complex is in the range of 0.001 to 3,000.

2. A process according to claim 1 wherein the solvent is a halogenated hydrocarbon.

3. The process of claim 2, wherein said halogenated hydrocarbon is selected from the group consisting of tetrachloromethane, chloroform, dichloroethane, trichloroethane, chlorobutane and chlorobenzene.

4. The process of claim 3, wherein said halogenated hydrocarbon is 1,2-dichloroethane.

5. A process according to claim 1 wherein the ether is tetrahydrofuran or tetrahydropyran.

6. A process according to claim 1 wherein said molar ratio is in a range of more than 200 to 3000.

7. A process according to claim 1 wherein said molar ratio is in a range of 0.001 to 0.1.

8. A process according to claim 1 wherein said molar ratio is in a range of 20 to 200.

9. A process according to claim 1 wherein said molar ratio is in a range of more than 0.1 to less than 20.

10. A process according to claim 1 wherein the solid catalytic component is washed with a solvent before combining it with the organoaluminum compound.

11. The process of claim 1, wherein said aluminum halide and/or boron halide is selected from the group consisting of AlCl3, AlBr3, AlI3, BF3, BCl3 and BBr3.

12. The process of claim 1, wherein the amount of said aluminum halide and/or boron halide is from 1.5 to 10 moles per mole of total Ti and V in said titanium chloride and vanadium chloride ether complexes.

13. The process of claim 1, wherein said organoaluminum compound is triisobutylaluminum or diethylaluminum chloride.

* * * * *